US011130189B2

(12) United States Patent
Knox et al.

(10) Patent No.: US 11,130,189 B2
(45) Date of Patent: Sep. 28, 2021

(54) APPLICATOR DEVICE

(71) Applicant: DAZCOM Ltd., Wickford (GB)

(72) Inventors: Stefan Knox, Haslemere Surrey (GB); Theodore Davies, Haslemere Surrey (GB)

(73) Assignee: DAZCOM Ltd., Wickford (GB)

( * ) Notice: Subject to any disclaimer, the term of this patent is extended or adjusted under 35 U.S.C. 154(b) by 114 days.

(21) Appl. No.: 16/468,502

(22) PCT Filed: Dec. 13, 2017

(86) PCT No.: PCT/GB2017/053726
§ 371 (c)(1),
(2) Date: Jun. 11, 2019

(87) PCT Pub. No.: WO2018/109463
PCT Pub. Date: Jun. 21, 2018

(65) Prior Publication Data
US 2020/0047272 A1  Feb. 13, 2020

(30) Foreign Application Priority Data

Dec. 14, 2016  (GB) ..................................... 1621241

(51) Int. Cl.
*A46B 3/00* (2006.01)
*A46B 5/00* (2006.01)
(Continued)

(52) U.S. Cl.
CPC .............. *B23K 3/082* (2013.01); *A46B 3/005* (2013.01); *A46B 5/0008* (2013.01);
(Continued)

(58) Field of Classification Search
CPC ......... A46B 3/005; A46B 3/00; A46B 5/0008; A46B 5/0004; A46B 5/0012;
(Continued)

(56) References Cited

U.S. PATENT DOCUMENTS

| D39,166  | S | 3/1908 | Ashley ........................... D9/529 |
| D163,535 | S | 3/1950 | Monturo ......................... D48/27 |

(Continued)

FOREIGN PATENT DOCUMENTS

| WO | WO 2018/109463 | 6/2018 | ............... A46B 3/00 |

OTHER PUBLICATIONS

International Search Report dated Mar. 27, 2018 for corresponding PCT Application No. PCT/GB2017/053726.
(Continued)

*Primary Examiner* — David J Walczak
(74) *Attorney, Agent, or Firm* — MacCord Mason PLLC

(57) ABSTRACT

An applicator device (1) for applying a composition to an end of a pipe. The applicator device comprises an applicator head (3), the applicator head having a cavity (9) with an opening into which the end of the pipe can be inserted. The applicator head comprises at least one brush (10) and at least one aperture (12) for delivering the composition into the cavity, each brush having bristles which extend into the cavity (9) to wipe against the end of the pipe, each aperture being closer to the opening of the cavity than to a base of the cavity. There is further provided an applicator device (1) comprising a supplementary brush for wiping the composition over an internal surface of the pipe, a container (60) of flux composition for connecting to the applicator device, and a method of applying a composition to an end of a pipe.

23 Claims, 5 Drawing Sheets

(51) Int. Cl.
*A46B 11/00* (2006.01)
*A46B 13/00* (2006.01)
*B23K 3/08* (2006.01)
*B05C 1/02* (2006.01)

(52) U.S. Cl.
CPC ........ *A46B 11/0006* (2013.01); *A46B 13/001* (2013.01); *B05C 1/022* (2013.01); *B05C 1/027* (2013.01); *A46B 11/0024* (2013.01); *A46B 11/0031* (2013.01); *A46B 2200/20* (2013.01); *A46B 2200/3013* (2013.01)

(58) Field of Classification Search
CPC ... A46B 5/0016; A46B 1/0006; A46B 11/001; A46B 11/002; A46B 11/0024; A46B 11/0027; A46B 11/0031; A46B 13/001; A46B 13/003; A46B 13/005; A46B 2200/20; A46B 2200/30; A46B 2200/3013; A46B 2200/3073; A46B 2200/3086; B23K 3/082; B23K 2101/06; B23K 3/08; A47L 13/06; A47L 13/12; A47L 13/26; A47L 13/286; A47L 17/02; A47L 25/00
USPC .............. 401/171–175, 9–11, 16, 18, 37, 38
See application file for complete search history.

(56) References Cited

U.S. PATENT DOCUMENTS

| | | | | |
|---|---|---|---|---|
| D188,223 S | 6/1960 | Lang | | D58/11 |
| 3,021,946 A | 2/1961 | Harris | | 206/56 |
| 3,436,783 A | 4/1969 | McCartney | | 15/104.03 |
| 3,850,183 A | 11/1974 | Guska | | 132/88.7 |
| 3,889,628 A * | 6/1975 | Usab | | B05C 17/002 |
| | | | | 118/711 |
| 4,133,070 A * | 1/1979 | Litt | | B24D 15/00 |
| | | | | 15/104.04 |
| 4,899,409 A * | 2/1990 | Cox, Jr. | | B08B 9/021 |
| | | | | 15/104.04 |
| D315,496 S | 3/1991 | Pettengill | | D9/373 |
| D402,193 S | 12/1998 | Bell et al. | | D9/300 |
| 5,908,253 A | 6/1999 | Sutter | | 401/9 |
| D415,413 S | 10/1999 | Cummings | | D9/300 |
| 6,039,483 A * | 3/2000 | Szekely | | A45D 40/04 |
| | | | | 222/390 |
| 6,299,369 B1 * | 10/2001 | Baines | | A45D 40/04 |
| | | | | 401/175 |
| D454,661 S | 3/2002 | Look | | D28/77 |
| D454,666 S | 3/2002 | Look | | D28/77 |
| D496,135 S | 9/2004 | Hillock | | D28/85 |
| D499,014 S | 11/2004 | Chadfield et al. | | D9/339 |
| D532,315 S | 11/2006 | Moutinho | | D9/725 |
| 7,377,707 B2 | 5/2008 | Breidenbach et al. | | 401/11 |
| D608,408 S | 1/2010 | Moody et al. | | D22/109 |
| D645,611 S | 9/2011 | Somers et al. | | D28/7 |
| D666,275 S | 8/2012 | DeVore et al. | | D23/223 |
| D669,364 S | 10/2012 | Schaeffer et al. | | D9/685 |
| D677,362 S | 3/2013 | Christopher | | D23/223 |
| D678,783 S | 3/2013 | Wilcox et al. | | D9/729 |
| 8,523,013 B2 | 9/2013 | Sines | | 221/279 |
| D704,298 S | 5/2014 | Cheng | | D22/109 |
| D739,083 S | 9/2015 | Ho | | D28/85 |
| D760,087 S | 6/2016 | Dittmer et al. | | D9/556 |
| 2010/0192975 A1 * | 8/2010 | Schweikert | | A61M 39/16 |
| | | | | 134/6 |
| 2012/0207531 A1 | 8/2012 | Rusev | | 401/175 |
| 2013/0075283 A1 | 3/2013 | Monson | | 206/216 |

OTHER PUBLICATIONS

Search and Examination Report issued by the UK IPO dated Jun. 7, 2017 for GB Application No. 1621241.7.
Search and Examination Report issued by the UK IPO dated Nov. 27, 2017 for GB Application No. 1621241.7.

* cited by examiner

APPLICATOR DEVICE

The present invention relates to an applicator device for applying a composition to an end of a pipe, for example a plumber may use the device to apply a flux composition to the end of the pipe prior to soldering.

BACKGROUND OF THE INVENTION

A known applicator device is described in GB 2470488, which discloses an applicator head having an annular flux composition dispensing region. Flux composition is dispensed into the bottom of the annular flux composition dispensing region, and the end of a pipe is inserted into the dispensing region to coat the end of the pipe with flux composition.

However, a large amount of flux composition may need to be dispensed into the dispensing region to fill it to a sufficient depth for a long enough portion of the length of the pipe to be coated, and a significant amount of flux composition may be left over in the bottom of the dispensing region and trap dirt after the end of the pipe has been coated and removed. The left over flux composition may subsequently leak out of the dispensing region, particularly in warm environments.

It is therefore an aim of the invention to provide an improved applicator device which is more economical with use of the composition.

SUMMARY OF THE INVENTION

According to one aspect of the invention, there is provided an applicator device for applying a composition to an end of a pipe. The applicator device comprises an applicator head, the applicator head having a cavity with an opening into which the end of the pipe can be inserted, wherein the applicator head comprises at least one brush and at least one aperture for delivering the composition into the cavity. Each brush has bristles which extend into the cavity to wipe against the end of the pipe, and each is aperture closer to the opening of the cavity than to a base of the cavity.

Since each aperture is closer to the opening of the cavity that the base of the cavity, the aperture delivers the composition to the side of the pipe, rather than to the very end of the pipe. The pipe can then be reciprocated within the cavity to so the brushes wipe the composition along the required length portion of the pipe. This helps prevent composition from accumulating at the base of the cavity, and means that only a small amount of composition needs to be delivered through the aperture(s) for the whole of the desired length of pipe to be coated.

Each brush may comprise a base from which the bristles extend, and may have one or more apertures extending through the base of the brush, to deliver the composition to the brush. Then, the composition can be transferred from the brush to the pipe when the pipe is reciprocated or rotated inside the cavity. Preferably, each brush only has one aperture for ejecting the composition, to promote efficient use of the composition.

The base of each brush may define a channel along which the composition is carried from an end of the brush adjacent the base of the cavity, to the aperture that extends through the base. Preferably, the aperture is located near and/or adjacent the opening of the cavity, for example no further than $1/3^{rd}$ of the distance from the opening of the cavity to the base of the cavity, more preferably no further than $1/4$ of the distance from the opening of the cavity to the base of the cavity. The channel provides a convenient method of routing the composition up to the aperture, and may be defined inside of the base of the brush, or at an opposite side of the base from where the bristles extend. For example, the channel may be defined between the brush and an outer housing of the applicator device, by providing a trough along the base of the brush and an outer housing which seals over the trough.

The at least one brushes may be mounted around a periphery of the cavity so the bristles of each brush wipe against an exterior surface of the pipe, and so the applicator device may further comprise a supplementary brush for coating the inside surfaces of the pipe with the composition. Preferably, the supplementary brush is movable into the cavity and sized to fit inside the cavity to receive the composition from the at least one aperture, and the supplementary brush is removable from inside the cavity so that it can be manually placed inside the end of the pipe to wipe the composition over an internal surface of the pipe.

The applicator device may have a storage bay where the supplementary brush can be stored. The storage bay may be remote from the applicator head, for example at an opposite side of the device from the applicator head, and so does not affect how the applicator head for coating the outside of the pipe operates.

Alternatively, the at least one brushes may include brushes mounted centrally inside the cavity which are received inside the end of the pipe and wipe the composition onto the inside surfaces of the pipe. However, providing the supplementary brush, instead of adding permanent brushes mounted centrally within the cavity, allows only the outside of the pipe or only the inside of the pipe to be coated with the composition, as desired by the user.

The applicator device may comprise a main body, the main body having a connector for connecting to a container of the composition that is to be applied to the end of the pipe by the applicator device. Then, the container can easily be discarded and a new container connected to the applicator device once the composition within the old container has all been used.

The container may comprise a container pipe filled with a flux composition, and a plunger for forcing the flux composition from the container into the main body of the applicator device. The movement of the plunger may be controlled by a rotatable base of the container, and the rotatable base may actuate a mechanism that produces audible clicks as the rotatable base is rotated, so that the amount of flux that is dispensed can be easily monitored by the user.

According to another aspect of the invention, there is provided a method of applying a composition to an end of a pipe, using an applicator device and a container of a composition, the method comprising connecting the container to the applicator device; actuating the plunger to drive the composition into the cavity of the applicator head; and inserting the end of the pipe into the cavity. The applicator device and the container of the composition may be the same as described further above.

DETAILED DESCRIPTION

Embodiments of the invention will now be described by way of non-limiting example only and with reference to the accompanying drawings, in which.

The figures are not to scale, and same or similar reference signs denote same or similar features.

Figure 1:
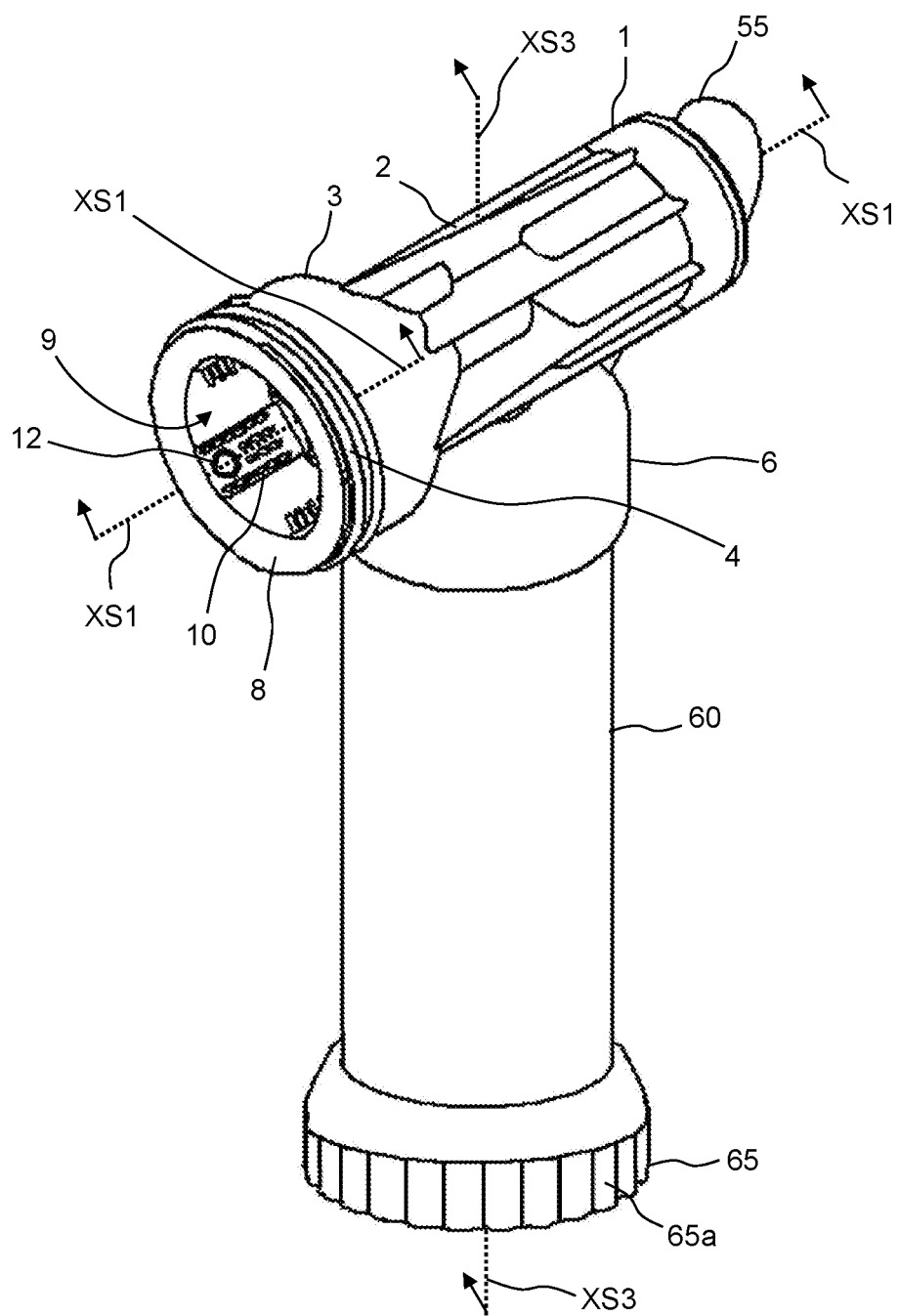
FIG. 1 shows a schematic perspective diagram of an applicator device according to an embodiment of the invention.

The schematic diagram of FIG. 1 shows an applicator device 1 which is removably connected to a container 60 that holds a flux composition. The container 60 is shown connected to a container connector portion 6 of the applicator device, and has a rotatable base 65 which can be rotated to dispense the flux composition. When the container 60 is connected to the applicator device 1, it may be considered as part of the applicator device 1.

The applicator device 1 comprises an outer housing which defines a main body 2, an applicator head 3, and the container connector portion 6. The applicator head 3 is substantially cylindrical, and has an open end providing a cavity 9. An end of a pipe may be inserted into the open end (opening) of the cavity 9 up to the base of the cavity 9 to coat the end of the pipe with flux composition from the container 60.

The outer housing around the entrance to the cavity 9 has screw threads 4, onto which a head cap can be screwed to prevent dust or debris from entering the cavity 9. A centre piece 8 is shown inside the outer housing of the applicator device, at the applicator head 3. The centre piece 8 holds four brushes 10 which are spaced apart from one another around the circumference of the cavity 9. Each brush 10 extends from a base of the cavity 9, to the opening of the cavity 9.

Each brush 10 has an aperture 12 through a base of the brush. The aperture 12 is adjacent the opening of the cavity 9, and closer to the opening of the cavity 9 than to the base of the cavity 9. In use, the rotatable base 65 is rotated to drive the flux composition out of the apertures 12, where it is brushed onto an end of a pipe inserted into the cavity 9 by the brushes 10.

Figure 2:
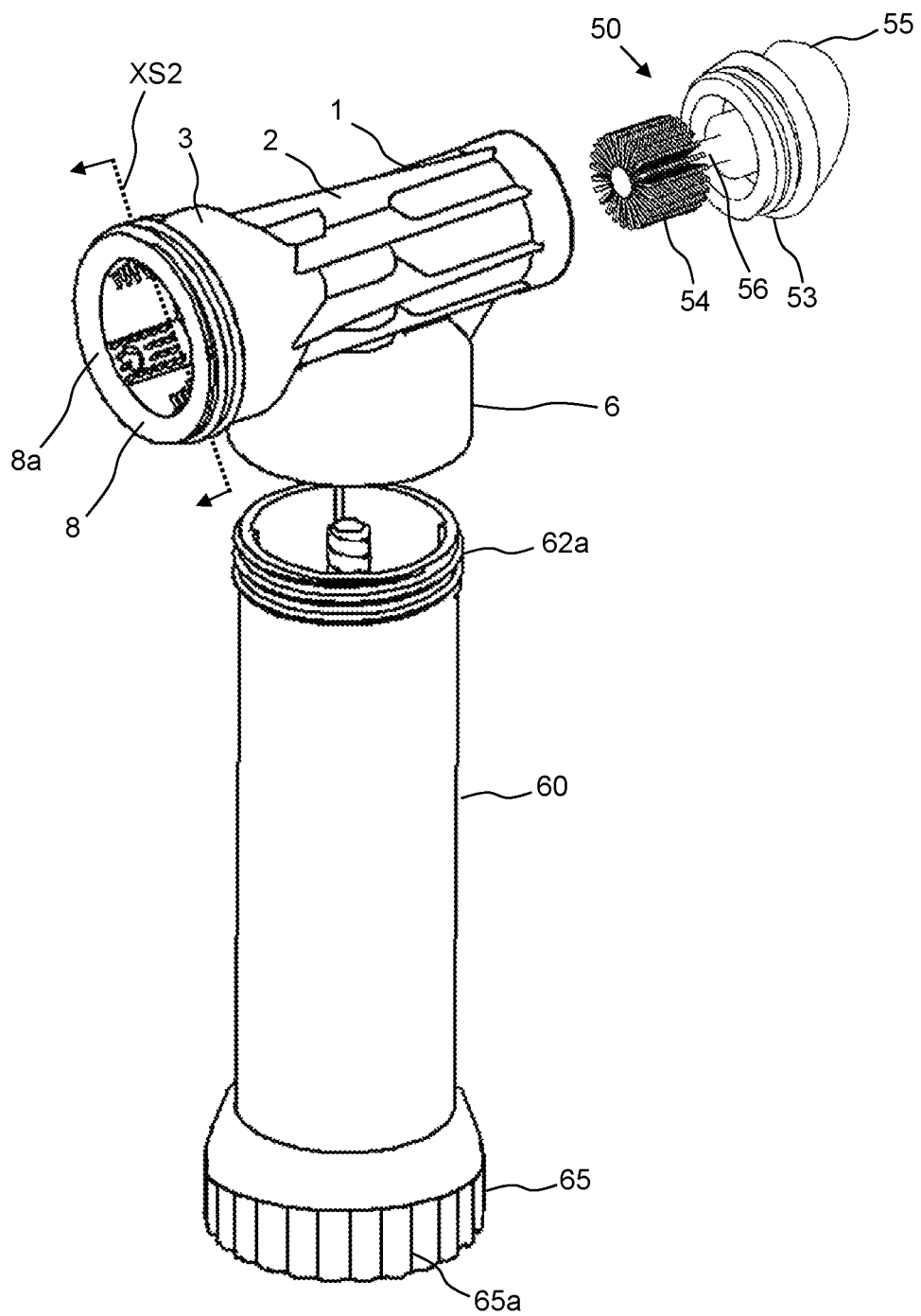
FIG. 2 shows another schematic perspective diagram of the applicator device of FIG. 1.

The schematic diagram of FIG. 2 shows the applicator device 1 when the container 60 and a supplementary brush 50 have been removed from the applicator device. The container connector portion 6 has an internal screw thread, and the container 60 has an external screw thread 62a, which has been unscrewed from the internal screw thread of the container connector portion 6. The supplementary brush 50 has been unscrewed and withdrawn from an end of the main body 2 which is opposite from the applicator head 3.

The supplementary brush 50 comprises an end cap 53, which is connected to brush bristles 54 which go inside the main body 2, and connected to a handle 55 which remains outside of the main body 2. The end cap 53 is formed as a circular plug which plugs into the end of the main body 2, to retain the brush bristles 54 inside the main body 2. The brush bristles 54 extend outwardly from a central shaft 56, and together form a cylindrical shape.

In use, the supplementary brush 50 can be withdrawn from the main body 2 by pulling and/or unscrewing it using the handle 55. The cylindrical shape of the brush bristles 54 is sized to fit inside the cavity 9, so that twisting the supplementary brush 50 whilst inside the cavity 9 transfers flux composition onto the brush bristles 54. Then, the brush bristles 54 can be withdrawn from the cavity 9 and inserted inside of the end of the pipe that is to be coated with flux composition, to transfer the flux composition from the brush bristles 54 to the inside surface of the pipe. The supplementary brush could also be used to brush the flux composition onto the outside of a pipe, or could be used to apply the flux composition to areas such as corners that are difficult to reach using the applicator head, or where there is restricted access to the pipe.

Figure 3:
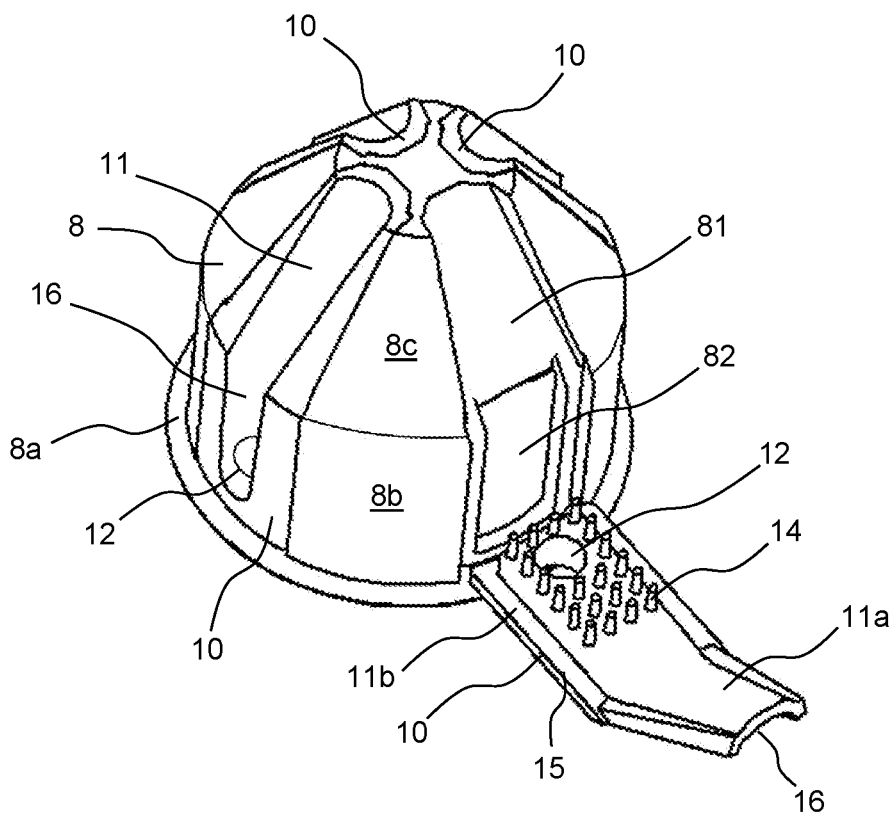
FIG. 3 shows a schematic perspective diagram of a centre piece and brushes of the applicator device of FIG. 1.

The schematic diagram of FIG. 3 shows the centre piece 8 and four brushes 10 in isolation from the rest of the applicator device. The centre piece 8 is formed as a single piece of material, for example of molded plastics, and comprises a cylindrical section 8b and a conical section 8c. The cylindrical section 8b forms the sides of the cavity 9, and the conical section 8c forms the base of the cavity 9. The cylindrical section 8b has a rim 8a, opposite from the conical section 8c, and the outer housing of the applicator device extends up to the rim 8a when the centre piece is fitted into the outer housing.

The cylindrical section 8b and conical section 8c have four slots 81 which are regularly spaced around the circumference of the centre piece 8. FIG. 3 shows three of the brushes 10 fitted in respective slots 81, and one of the brushes 10 outside of its respective slot 81, for illustrative purposes. Each slot 81 extends along both the cylindrical section 8b and conical section 8c, and extends only partially through the thicknesses of the cylindrical section 8b and conical section 8c. A hole 82 is provided at the base of each slot 81, within the cylindrical section 8b, and the hole extends fully through the thickness of the cylindrical section 8b, into the cavity 9.

Each brush 10 has a base 15, which includes a bristle portion 11b and a root portion 11a. The bristle portion 11b has bristles 14 extending from it, and the root portion 11a is devoid of bristles. The bristle portion 11b of the base 15 has the aperture 12 passing all the way through it, and the aperture 12 is located in between the bristles 14. The base 15 fits into the slot 81 of the centre piece 8, with the bristle portion 11b fitting against the cylindrical section 8b, and the root portion 11a fitting against the conical section 8c. Accordingly, the bristles 14 extend through the hole 82 and into the cavity 9.

An opposite side of the base 15 from the side having the bristles 14 includes a trough 16. The trough 16 extends along both the bristle portion 11b and a root portion 11a of the base 15, from the aperture 12 near the opening of the cavity, to an opposite end of the base 15. In use, the flux composition travels along the troughs 16, and then through the apertures 12, into the cavity 9 between the bristles 14.

Figure 4:
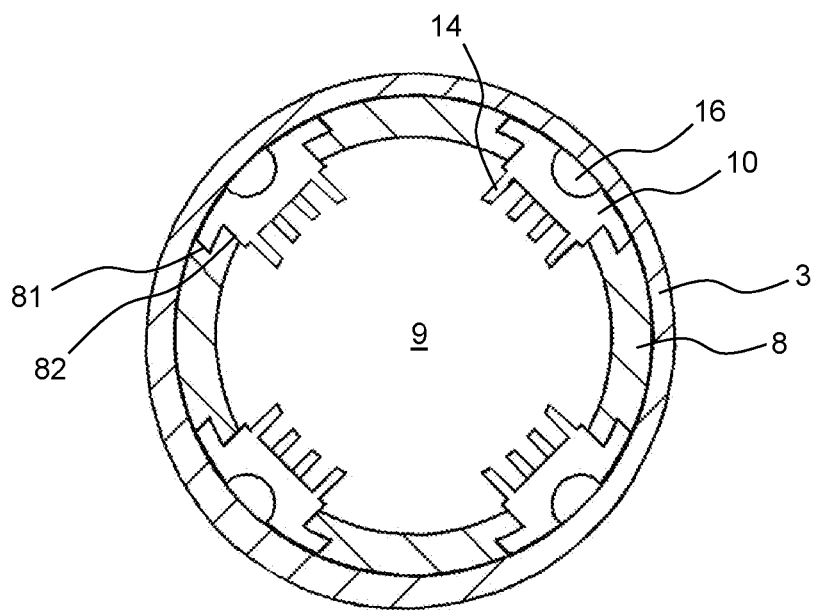
FIG. 4 shows a schematic cross-sectional diagram taken through an applicator head of the applicator device of FIG. 1

The schematic diagram of FIG. 4 shows a cross-sectional view through the applicator head 3 when the centre piece 8 and brushes 10 are assembled into the outer housing at the applicator head. The cross-sectional view has been taken looking in along XS2 marked on FIG. 2. As shown in FIG. 4, the brushes 10 are held in between the centre piece 8 and the outer housing of the applicator head 3, and the cavity 9 is inside of the centre piece 8, with the bristles 14 extending into the cavity 9. The tops of the troughs 16 of the brushes are sealed off by the outer housing, to form channels along which the flux composition can be forced to the apertures 12, and delivered into the cavity 9.

Figure 5:
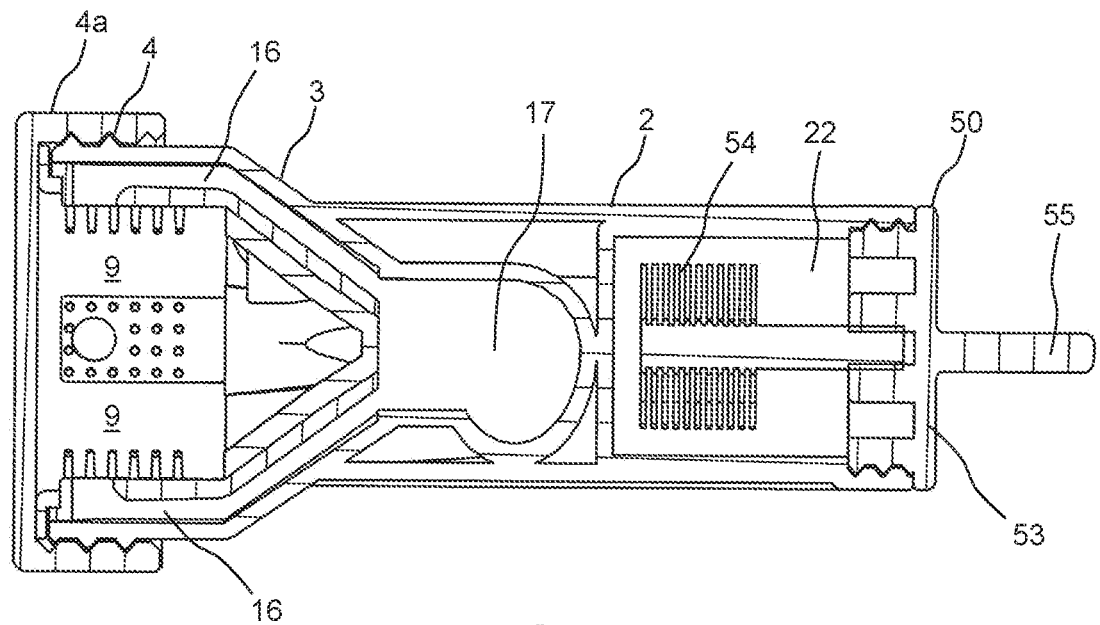
FIG. 5 shows a schematic cross-sectional diagram taken through the applicator device of FIG. 1.

The schematic diagram of FIG. 5 shows a cross-sectional view through the whole applicator device, taken looking in from XS1 marked on FIG. 1. In FIG. 5, it can be seen that the troughs 16 of the brushes lead to a central conduit 17, where the flux composition is received from the container 60. The view of FIG. 5 slightly deviates from FIG. 1 in that FIG. 5 shows the head cap 4a which has been screwed onto the screw threads 4 of the outer housing of the applicator head, to prevent dust or debris entering the cavity 9 whilst the applicator device is not being used. The head cap 4a is substantially cylindrical with screw threads to engage the screw threads 4. The view of FIG. 5 also shows the brush bristles 54 stored inside a storage bay 22 of the main body 2 of the applicator device.

Figure 6:
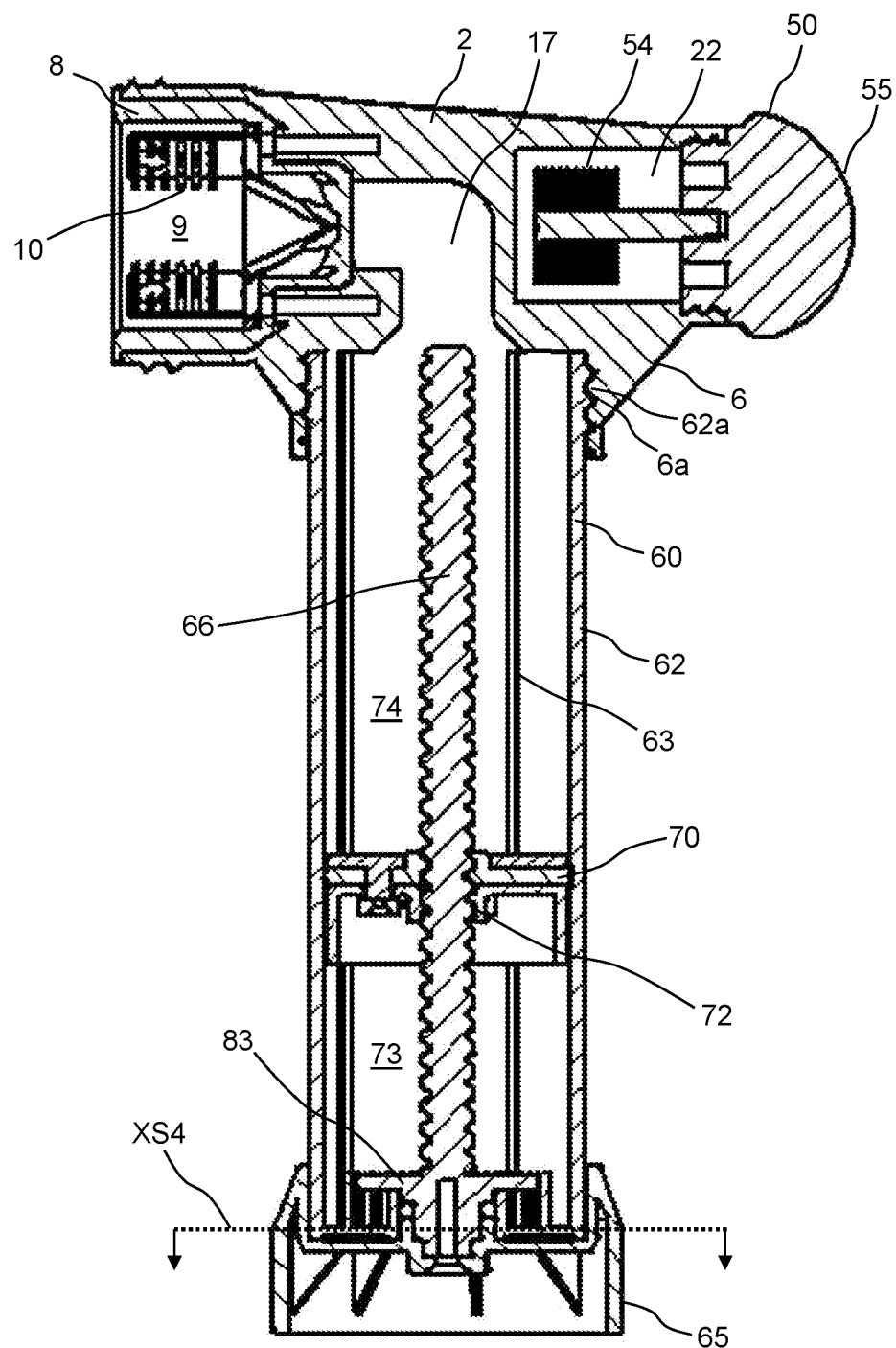
FIG. 6 shows another schematic cross-sectional diagram taken through the applicator device of FIG. 1.

The schematic diagram of FIG. 6 shows a cross-sectional view through the whole applicator device, taken looking in from XS3 marked on FIG. 1. In this view the details of the container 60 can be seen. Specifically, the container 60 comprises a container pipe in the form of a plastics cylinder 62, which has four ridges 63 running along its length, on an inside surface of the cylinder 62. A plunger 70 is fitted inside the cylinder 62, and comprises four corresponding grooves for receiving the four ridges 63. These grooves and ridges hold the plunger 70 at a fixed rotation relative to the cylinder 62, whilst still allowing the plunger to move up and down the cylinder 62.

The plunger 70 defines a cavity 74 inside the container 60, the cavity 74 being filled with flux composition. Accordingly, moving the plunger 70 upwardly towards the applicator body 2 reduces the volume of the cavity 74, squeezing the flux composition through the central conduit 17, along the troughs 16, and through the apertures 12 into the cavity 9. An empty cavity 73 remains behind the plunger 70.

The movement of the plunger 70 is driven by a threaded rod 66, which passes through a threaded aperture 72, through the plunger 70. When the threaded rod 66 is rotated clockwise, the threads force the plunger upwardly.

The threaded rod is integrally formed with a spindle 83 at its base, and the spindle 83 is fixedly mounted to the rotatable base 65. The rotatable base is substantially cylindrical, and is provided with ridges 65a around its outside surface, the ridges extending parallel to the central axis of the substantially cylindrical shape of the base 65. The ridges 65a assist the user in gripping and rotating the base 65 clockwise, causing the threaded rod to turn, and driving the plunger upwardly towards the main body 2 to dispense the flux composition. To help the user measure the amount of flux composition that is dispensed, the container 60 comprises a mechanism that produces audible clicks as the rotatable base 65 is rotated, as will be described further below with reference to FIG. 7.

The screw threads 62a are formed at the top end of the cylinder 62, on the external surface of the cylinder 60, and these screw threads engage with screw threads 6a formed inside the connector 6 of the outer housing. Accordingly, once the plunger 70 has been moved all the way to the top of the cylinder 62 to empty the cylinder 62 of the flux composition, the cylinder 62 can be unscrewed from the connector 6, discarded, and replaced by a new container 60 filled with flux composition.

Conveniently, an end cap of the container 60 is screwed onto the threads 62a during manufacture of the container, to help retain the flux composition inside the container until the container is to be used, whereupon the end cap can be unscrewed and discarded, and the threads 62a screwed into the threads 6a of the applicator device.

Figure 7:
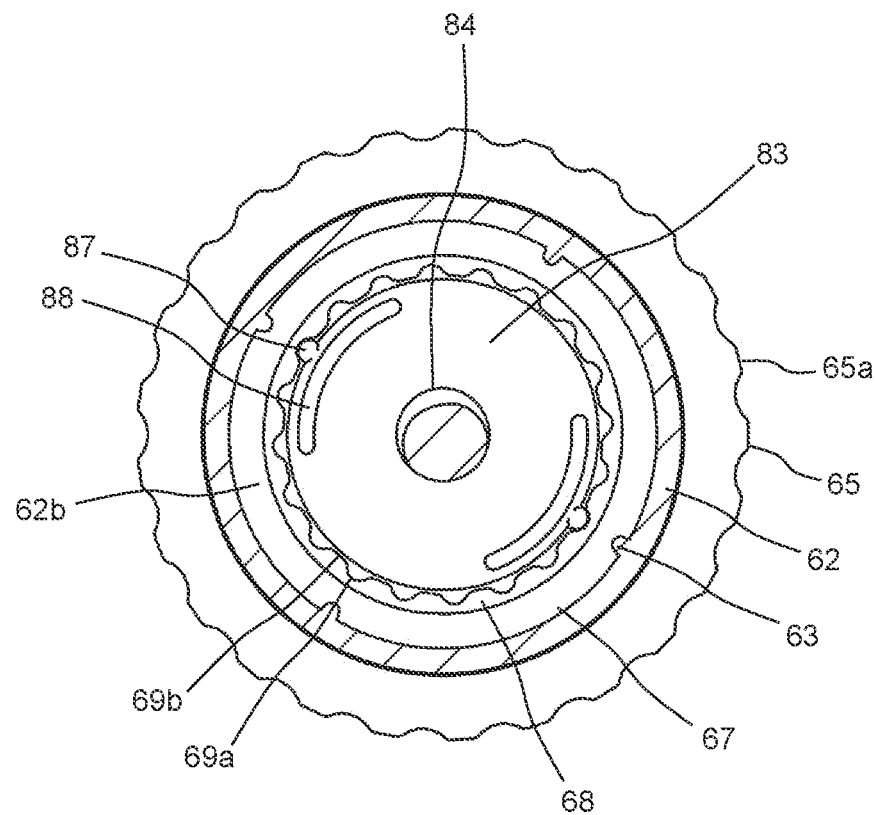
FIG. 7 shows a schematic cross-sectional diagram taken through a rotatable base of the applicator device of FIG. 1.

The schematic diagram of FIG. 7 shows a cross-sectional view looking in from XS4 marked on FIG. 6. The outermost part shown in FIG. 7 is the substantially cylindrical base 65, with its ridges 65a. Inside the substantially cylindrical base 65 is the plastics cylinder 62, around which the cylindrical base 65 can rotate. The four ridges 63 that extend parallel to the axis of the plastics cylinder 62, and keep the plunger 70 in a fixed rotation relative to the plastics cylinder 62, can be seen extending from the inside surface of the plastics cylinder 62 towards the axis of the plastics cylinder 62.

The plastics cylinder 62 has a bottom 62b at the bottom end of the cylinder, the bottom closing off the end of the plastics cylinder 62. The rotatable base 65 comprises a spike which extend axially upwards through a hole in the bottom 62b. The spike is fixed in a hole 84 of the spindle 83, as shown, and so the spindle 83 rotates as one with the rotatable base 65.

The bottom 62b has a substantially circular ring 68 fixed on the bottom 62b, and the inner surface of the ring 68 is shaped with a plurality of depressions 69a and a plurality of protrusions 69b arranged regularly along the inner surface of the ring 68. The spindle 83 has two sprung protrusions 87 that protrude opposite one another from the outer surface of the spindle 83. The spindle 83 has two cut-away portions 88 for the respective sprung protrusions 87, each cut-away allowing the corresponding sprung protrusion to deflect inwardly towards the axis of the spindle and threaded rod. The sprung protrusions 87 are biased into the depressions 69a of the ring 68 by the spindle and its cut-away portions.

When the base 65 of the container is rotated, the spindle 83 rotates, causing the sprung protrusions 87 to snap over protrusions 69b to the next depressions 69a, creating an audible click. Since the plurality of depressions 69a and plurality of protrusions 69b are arranged regularly, the number of audible clicks corresponds to the amount of rotation of the spindle, and the amount of movement of the plunger 70 along the threaded rod 66. Therefore, the user can use the number of clicks to monitor the amount of flux composition that is being dispensed into the cavity 9.

Alternative arrangements for actuating a plunger to drive a composition out of a container may also be implemented, for example the plunger could be manually pushed, or pushed via lever(s).

The applicator device may be manufactured in different sizes for coating different diameter pipes with compositions. For example, brushes with longer bristles 14 may be fitted into the centre piece 8 to facilitate coating of smaller diameter pipes, with all other components of the applicator device remaining the same.

The applicator device may be designed to apply compositions other than flux compositions, for example a sealing compound to help prevent leaks from a pipe joint.

Different methods of mounting the brushes inside the applicator head may alternatively be used, for example the outer housing may be formed with slots to allow brushes to slot directly into it, rather than using a separate centre piece.

The apertures 12 could be formed directly in the outer housing, separate from the brushes 10. For example, the channels for the composition could be formed as passageways within the outer housing, or additional components could be provided to define the channels and apertures.

Preferably, the applicator device components are all made of plastics materials, although other types of materials could alternatively be used if desired.

Many other variations of the described embodiments falling within the scope of the appended claims will also be apparent to those skilled in the art.

The invention claimed is:

1. An applicator device for applying a composition to an end of a pipe, the applicator device comprising an applicator head, the applicator head having a cavity with an opening into which the end of the pipe can be inserted, wherein the applicator head comprises at least one brush and at least one aperture for delivering the composition into the cavity, each brush having bristles which extend into the cavity to wipe against the end of the pipe, each aperture being closer to the opening of the cavity than to a base of the cavity;

wherein each brush comprises a base from which the bristles extend and wherein the at least one apertures extend through the bases of the at least one brushes, to deliver the composition to the brushes; and wherein the applicator head comprises a centre piece which holds the base of each brush between the centre piece and an outer housing of the applicator head.

2. The applicator device of claim 1, wherein each brush extends from adjacent the base of the cavity to adjacent the opening of the cavity, to wipe over a length portion of the pipe at the end of the pipe.

3. The applicator device of claim 1, wherein each aperture extends through the base at a location in between the bristles that extend from the base.

4. The applicator device of claim 1, wherein the base of each brush fits into a respective slot in a periphery of the centre piece.

5. The applicator device of claim 1, wherein the base of each brush defines a channel along which the composition is carried from an end of the brush adjacent the base of the cavity, to an aperture of the least one apertures that extends through the base.

6. The applicator device of claim 5, wherein the channel is defined by a trough along the base of the brush and the outer housing which seals over the trough.

7. The applicator device of claim 5, wherein the base of each brush comprises a root portion which is devoid of any bristles, and wherein the channel extends along the root portion of the brush.

8. The applicator device of claim 1, wherein the at least one brushes are mounted around an outside periphery of the cavity so the bristles of each brush wipe against an exterior surface of the pipe.

9. The applicator device of claim 8, further comprising a supplementary brush which is movable into the cavity and sized to fit inside the cavity to receive the composition from the at least one aperture, wherein the supplementary brush is removable from inside the cavity so that it can be placed inside the end of the pipe to wipe the composition over an internal surface of the pipe.

10. The applicator device of claim 9, further comprising a storage bay in which the supplementary brush is stored when not being used.

11. The applicator device of claim 1, wherein the applicator device comprises a main body, the main body having a connector for connecting to a container of the composition that is to be applied to the end of the pipe by the applicator device, and the main body comprising one or more conduits for routing the composition from the connector to the applicator head.

12. The applicator device of claim 11, further comprising the container connected to the main body by the connector, wherein the container comprises a container pipe filled with a flux composition, and a plunger for forcing the flux composition from the container into the main body of the applicator device.

13. The applicator device of claim 12, wherein the container comprises a rotatable base connected to a threaded rod, the rotatable base and threaded rod being rotatable relative to the container pipe, wherein the plunger is connected to the threaded rod and is held in fixed rotation relative to the container pipe, so that rotation of the rotatable base and threaded rod causes the plunger to move along the container pipe and drive the flux composition out of the container and towards the applicator head.

14. The applicator device of claim 13, wherein the plunger is held in the fixed rotation relative to the container pipe by one or more ridges running along the container pipe being located in one or more grooves running along the plunger, wherein the grooves and ridges run parallel to an axis of the container pipe.

15. The applicator device of claim 13, wherein the container comprises a mechanism that produces audible clicks as the rotatable base is rotated for monitoring the amount of flux composition that is dispensed from the container.

16. The applicator device of claim 15, wherein the mechanism comprises:

a circular ring having a plurality of depressions and protrusions arranged regularly around the ring; and at least one sprung protrusion which is biased towards the circular ring to locate in one of the plurality of depressions, wherein rotation of the rotatable base rotates the circular ring and the sprung protrusion relative to one another to create the audible clicks as the sprung protrusion snaps over the plurality of depressions and protrusions.

17. An applicator device for applying a composition to an end of a pipe, the applicator device comprising an applicator head, the applicator head having a cavity with an opening into which the end of the pipe can be inserted up to a base of the cavity, wherein the applicator head comprises at least one aperture for delivering the composition into the cavity and at least one brush, each brush having bristles which extend into the cavity to wipe against the end of the pipe, wherein each brush comprises a base from which the bristles extend and wherein the at least one apertures extend through the bases of the at least one brushes, to deliver the composition to the brushes, wherein the applicator head comprises a centre piece which holds the base of each brush between the centre piece and an outer housing of the applicator head, wherein the applicator device comprises a supplementary brush which is movable into the cavity and sized to fit inside the cavity to receive the composition from the at least one aperture, wherein the supplementary brush is removable from inside the cavity so that it can be placed inside the end of the pipe to wipe the composition over an internal surface of the pipe.

18. The applicator device of claim 17, further comprising a storage bay in which the supplementary brush is stored when not being used.

19. The applicator device of claim 17, wherein the applicator device comprises a main body, the main body having a connector for connecting to a container of the composition to be applied to the end of the pipe by the applicator device, and the main body comprising one or more conduits for routing the composition from the connector to the applicator head.

20. The applicator device of claim 19, further comprising the container connected to the main body by the connector, wherein the container comprises a container pipe filled with a flux composition, and a plunger for forcing the flux composition from the container into the main body of the applicator device.

21. The applicator device of claim 1, further comprising a container of flux composition for application to an end of a pipe, wherein the container comprises a connector for connecting to the applicator device, wherein the container comprises a container pipe filled with the flux composition, and a plunger for forcing the flux composition from the container into the applicator device via the connector, wherein the container comprises a rotatable base connected to a threaded rod, the rotatable base and threaded rod being rotatable relative to the container pipe, wherein the plunger is connected to the threaded rod and is held in fixed rotation relative to the container pipe, so that rotation of the rotatable base and threaded rod causes the plunger to move along the container pipe and drive the flux composition out of the container and towards the applicator head.

22. The applicator device of claim 21, wherein the plunger is held in the fixed rotation relative to the container pipe by one or more ridges running along the container pipe being located in one or more grooves running along the plunger, wherein the grooves and ridges run parallel to an axis of the container pipe.

23. The applicator device of claim 21, wherein the container comprises a mechanism that produces audible clicks as the rotatable base is rotated for monitoring the amount of flux composition that is dispensed from the container.

* * * * *